US008066620B2

(12) United States Patent
Sah

(10) Patent No.: US 8,066,620 B2
(45) Date of Patent: Nov. 29, 2011

(54) METHOD OF CLUTCH ACTUATION FOR HYBRID TRANSMISSIONS

(75) Inventor: Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 332 days.

(21) Appl. No.: 12/468,096

(22) Filed: May 19, 2009

(65) Prior Publication Data
US 2010/0298089 A1 Nov. 25, 2010

(51) Int. Cl.
*B60W 10/02* (2006.01)
(52) U.S. Cl. .......................................................... 477/175
(58) Field of Classification Search .................. 477/5, 50, 477/70, 86, 73, 175; 192/103 F, 109 F
See application file for complete search history.

(56) References Cited

U.S. PATENT DOCUMENTS

| 5,058,460 A * | 10/1991 | Hibner et al. ................. 477/154 |
| 5,070,747 A * | 12/1991 | Lentz et al. ................... 477/149 |
| 5,072,390 A * | 12/1991 | Lentz et al. ..................... 701/60 |
| 5,079,970 A * | 1/1992 | Butts et al. .................... 477/102 |
| 5,314,050 A * | 5/1994 | Slicker et al. ................. 477/171 |
| 5,378,211 A * | 1/1995 | Slicker et al. ................. 477/174 |
| 5,475,595 A * | 12/1995 | Asahara et al. ................. 701/51 |
| 5,551,930 A * | 9/1996 | Creger et al. .................. 477/130 |
| 5,580,332 A * | 12/1996 | Mitchell et al. ............... 477/143 |
| 5,611,750 A * | 3/1997 | Kono et al. ..................... 477/65 |
| 5,779,595 A * | 7/1998 | Kono et al. .................... 477/174 |
| 5,803,869 A * | 9/1998 | Jamzadeh et al. ............. 477/168 |
| 5,950,789 A * | 9/1999 | Hosseini et al. ........... 192/85.01 |
| 6,039,674 A * | 3/2000 | Dourra et al. ................. 477/166 |
| 6,258,010 B1 * | 7/2001 | Bai et al. ........................ 477/143 |
| 6,285,942 B1 * | 9/2001 | Steinmetz et al. .............. 701/67 |
| 6,375,596 B1 * | 4/2002 | Steeby ............................. 477/86 |
| H2031 H * | 6/2002 | Harrell et al. ................... 701/68 |
| 6,551,208 B1 * | 4/2003 | Holmes et al. .................... 475/5 |
| 6,640,950 B2 * | 11/2003 | Harvey et al. .............. 192/85.01 |
| 6,729,459 B2 * | 5/2004 | Reinards et al. ............ 192/103 F |
| 6,730,000 B1 * | 5/2004 | Leising et al. ................. 477/110 |
| 6,915,890 B1 * | 7/2005 | Whitton et al. ............. 192/85.63 |
| 6,928,357 B2 * | 8/2005 | Higashimata et al. .......... 701/87 |
| 6,997,299 B2 * | 2/2006 | Brissenden et al. ..... 192/48.601 |
| 7,003,388 B2 * | 2/2006 | Nakamura ...................... 701/67 |
| 7,010,406 B2 | 3/2006 | Sah et al. |
| 7,130,734 B2 * | 10/2006 | Sah et al. ......................... 701/67 |
| 7,212,898 B2 * | 5/2007 | Whitton et al. ................. 701/51 |
| 7,217,211 B2 | 5/2007 | Klemen et al. |
| 7,234,367 B2 * | 6/2007 | Hou et al. .......................... 74/11 |
| 7,324,885 B2 | 1/2008 | Sah et al. |
| 7,326,149 B2 * | 2/2008 | Kraska et al. ................. 477/135 |

(Continued)

*Primary Examiner* — J. Allen Shriver, II
*Assistant Examiner* — Brodie Follman
(74) *Attorney, Agent, or Firm* — Quinn Law Group, PLLC

(57) ABSTRACT

A method of actuating a clutch includes commanding a shift, monitoring slip speed, beginning synchronization, filling to a pre-fill volume, and holding at the pre-fill volume. After slip speed reaches a trigger point, the clutch is filled to a first predicted touch point volume, which is greater than the pre-fill volume. The pre-fill volume is approximately 80 to 90 percent of the first predicted touch point volume. The method may determine slip speed derivative, and set the trigger point based thereupon. The method may monitor actual touch point volume and calculate a flow model, which is used to determine when the pre-fill volume has been reached. Filling the clutch to the pre-fill volume may begin simultaneously with commanding the shift. Pressure is generated by an auxiliary pump, which receives power from sources other than an internal combustion engine.

14 Claims, 4 Drawing Sheets

U.S. PATENT DOCUMENTS

| | | | |
|---|---|---|---|
| 7,344,477 B2* | 3/2008 | Dourra et al. | 477/143 |
| 7,356,398 B2* | 4/2008 | Steinmetz et al. | 701/55 |
| 7,374,513 B2* | 5/2008 | Whitton | 477/146 |
| 7,440,833 B2* | 10/2008 | Chen | 701/51 |
| 7,574,906 B2* | 8/2009 | Dourra et al. | 73/149 |
| 7,590,480 B2* | 9/2009 | Dlugoss | 701/51 |
| 7,643,925 B2* | 1/2010 | Whitton | 701/67 |
| 7,682,285 B2* | 3/2010 | Kraska et al. | 477/130 |
| 7,693,635 B2* | 4/2010 | Rains | 701/51 |
| 7,789,798 B2* | 9/2010 | Chen | 477/156 |
| 7,798,941 B2* | 9/2010 | Bai | 477/180 |
| 7,846,065 B2* | 12/2010 | Chen | 477/168 |
| 2003/0029691 A1* | 2/2003 | Lorentz et al. | 192/85 R |
| 2003/0051969 A1* | 3/2003 | Reinards et al. | 192/103 F |
| 2003/0079952 A1* | 5/2003 | Smith et al. | 192/21.5 |
| 2004/0111203 A1* | 6/2004 | Higashimata et al. | 701/51 |
| 2004/0192506 A1* | 9/2004 | Nakamura | 477/176 |
| 2005/0076958 A1* | 4/2005 | Foster et al. | 137/596 |
| 2005/0257632 A1* | 11/2005 | Runde et al. | 73/865.9 |
| 2006/0100060 A1* | 5/2006 | Kraska et al. | 477/156 |
| 2006/0178244 A1* | 8/2006 | Whitton et al. | 477/181 |
| 2006/0219509 A1* | 10/2006 | Kabrich et al. | 192/3.63 |
| 2007/0004548 A1* | 1/2007 | Bai | 475/129 |
| 2007/0010926 A1* | 1/2007 | Dlugoss | 701/51 |
| 2007/0054775 A1* | 3/2007 | Chen et al. | 477/121 |
| 2007/0056826 A1* | 3/2007 | Burns et al. | 192/70.12 |
| 2007/0174000 A1* | 7/2007 | Chen | 701/51 |
| 2007/0276569 A1 | 11/2007 | Sah et al. | |
| 2008/0058152 A1* | 3/2008 | Ortmann | 477/3 |
| 2008/0060717 A1* | 3/2008 | Dourra et al. | 141/95 |
| 2008/0076634 A1* | 3/2008 | Chen | 477/174 |
| 2008/0081736 A1* | 4/2008 | Chen | 477/116 |
| 2008/0182696 A1 | 7/2008 | Sah et al. | |
| 2008/0234097 A1 | 9/2008 | Sah | |
| 2010/0167871 A1* | 7/2010 | Inagaki et al. | 477/5 |
| 2010/0227735 A1* | 9/2010 | Sah et al. | 477/5 |
| 2010/0228412 A1* | 9/2010 | Sah | 701/22 |
| 2010/0248892 A1* | 9/2010 | Sah | 477/5 |
| 2010/0279816 A1* | 11/2010 | Soliman | 477/3 |
| 2010/0298089 A1* | 11/2010 | Sah | 477/5 |
| 2010/0298090 A1* | 11/2010 | Sah | 477/5 |
| 2010/0305791 A1* | 12/2010 | Sah et al. | 701/22 |
| 2011/0086740 A1* | 4/2011 | Suzuki et al. | 477/5 |

* cited by examiner

| Transmission State | C4 | C3 | C2 | C1 |
|---|---|---|---|---|
| Neutral1 | Off | Off | Off | Off |
| ETC1 | Off | Off | Off | ON |
| ETC2 | Off | Off | ON | Off |
| ETC12 | Off | Off | ON | ON |
| Neutral2 | Off | ON | Off | Off |
| EVT1 | Off | ON | Off | ON |
| EVT4 | Off | ON | ON | Off |
| Park | Off | ON | ON | ON |
| Neutral3 | ON | Off | Off | Off |
| EVT2 | ON | Off | Off | ON |
| EVT3 | ON | Off | ON | Off |
| FG2 | ON | Off | ON | ON |
| Neutral4 | ON | ON | Off | Off |
| FG1 | ON | ON | Off | ON |
| FG3 | ON | ON | ON | Off |

METHOD OF CLUTCH ACTUATION FOR HYBRID TRANSMISSIONS

TECHNICAL FIELD

The present invention relates generally to hybrid powertrains for vehicles, and hydraulic control thereof

BACKGROUND OF THE INVENTION

Motorized vehicles include a powertrain operable to propel the vehicle and power the onboard vehicle electronics. The powertrain, or drivetrain, generally includes an engine that powers the final drive system through a multi-speed power transmission. Many vehicles are powered by a reciprocating-piston type internal combustion engine (ICE).

Hybrid vehicles utilize alternative power sources to propel the vehicle, minimizing reliance on the engine for power. A hybrid electric vehicle (HEV), for example, incorporates both electric energy and chemical energy, and converts the same into mechanical power to propel the vehicle and power the vehicle systems. The HEV generally employs one or more electric machines that operate individually or in concert with an internal combustion engine to propel the vehicle. Since hybrid vehicles can derive their power from sources other than the engine, engines in hybrid vehicles may be turned off while the vehicle is stopped or is being propelled by the alternative power source(s).

Parallel hybrid architectures are generally characterized by an internal combustion engine and one or more electric motor/generator assemblies, all of which have a direct mechanical coupling to the transmission. Parallel hybrid designs utilize combined electric motor/generators, which provide traction and may replace both the conventional starter motor and alternator. The motor/generators are electrically connected to an energy storage device (ESD). The energy storage device may be a chemical battery. A control unit is employed for regulating the electrical power interchange between the energy storage device and motor/generators, as well as the electrical power interchange between the first and second motor/generators.

Electrically-variable transmissions (EVT) provide for continuously variable speed ratios by combining features from both series and parallel hybrid powertrain architectures, and also elements of traditional, non-hybrid transmissions. EVTs may be designed to operate in both fixed-gear (FG) modes and EVT modes. When operating in a fixed-gear mode, the rotational speed of the transmission output member is a fixed ratio of the rotational speed of the input member from the engine, depending upon the selected arrangement of the differential gearing subsets. EVTs may also be configured for engine operation that is mechanically independent from the final drive.

The EVT can utilize the differential gearing to send a fraction of its transmitted power through the electric motor/generator(s) and the remainder of its power through another, parallel path that is mechanical. One form of differential gearing used is the epicyclic planetary gear arrangement. However, it is possible to design a power split transmission without planetary gears, for example, as by using bevel gears or other differential gearing.

Hydraulically-actuated torque-transmitting mechanisms, such as clutches and brakes, are selectively engageable to selectively activate the gear elements for establishing different forward and reverse speed ratios and modes between the transmission input and output shafts. The term "clutch" is used hereinafter to refer generally to torque transmitting mechanisms, including, without limitation, devices commonly referred to as clutches and brakes. Shifting from one speed ratio or mode to another may be in response to vehicle conditions and operator (driver) demands. The "speed ratio" is generally defined as the transmission input speed divided by the transmission output speed. Thus, a low gear range has a high speed ratio, and a high gear range has a relatively lower speed ratio. Because EVTs are not limited to single-speed gear ratios, the different operating states may be referred to as ranges or modes.

SUMMARY OF THE DISCLOSURE

A method of actuating a clutch of a multi-mode hybrid transmission is provided. The method includes commanding a shift, monitoring a slip speed of the clutch, and beginning synchronization of the clutch by moving the slip speed to zero. The clutch is filled to a pre-fill target volume, and held at the pre-fill target volume. After the slip speed reaches a trigger point, the clutch is filled to a first predicted touch point volume. The first predicted touch point volume is greater than the pre-fill target volume. The pre-fill target volume may be in a range of approximately 80 to 90 percent of the first predicted touch point volume.

The method may include determining a time rate of change of the slip speed, and setting the trigger point based upon the determined time rate of change of the slip speed. The method may monitor an actual pressure of the clutch and calculate an actual touch point volume from the monitored actual pressure. A flow model may then be calculated based upon the calculated actual touch point volume, the flow model used to determine when the clutch has been filled to the pre-fill target volume.

Filling the clutch to the pre-fill target volume may begin approximately simultaneously with commanding the shift. Filling the clutch includes generating pressure by using an auxiliary pump, which is characterized by receiving power from sources other than an internal combustion engine. The trigger point may be set to occur substantially simultaneously with completion of clutch synchronization, such that the trigger point occurs when the slip speed reaches zero.

The above features and advantages, and other features and advantages of the present invention will be readily apparent from the following detailed description of the preferred embodiments and other modes for carrying out the present invention when taken in connection with the accompanying drawings and appended claims.

DESCRIPTION OF PREFERRED EMBODIMENTS

Figure 1:
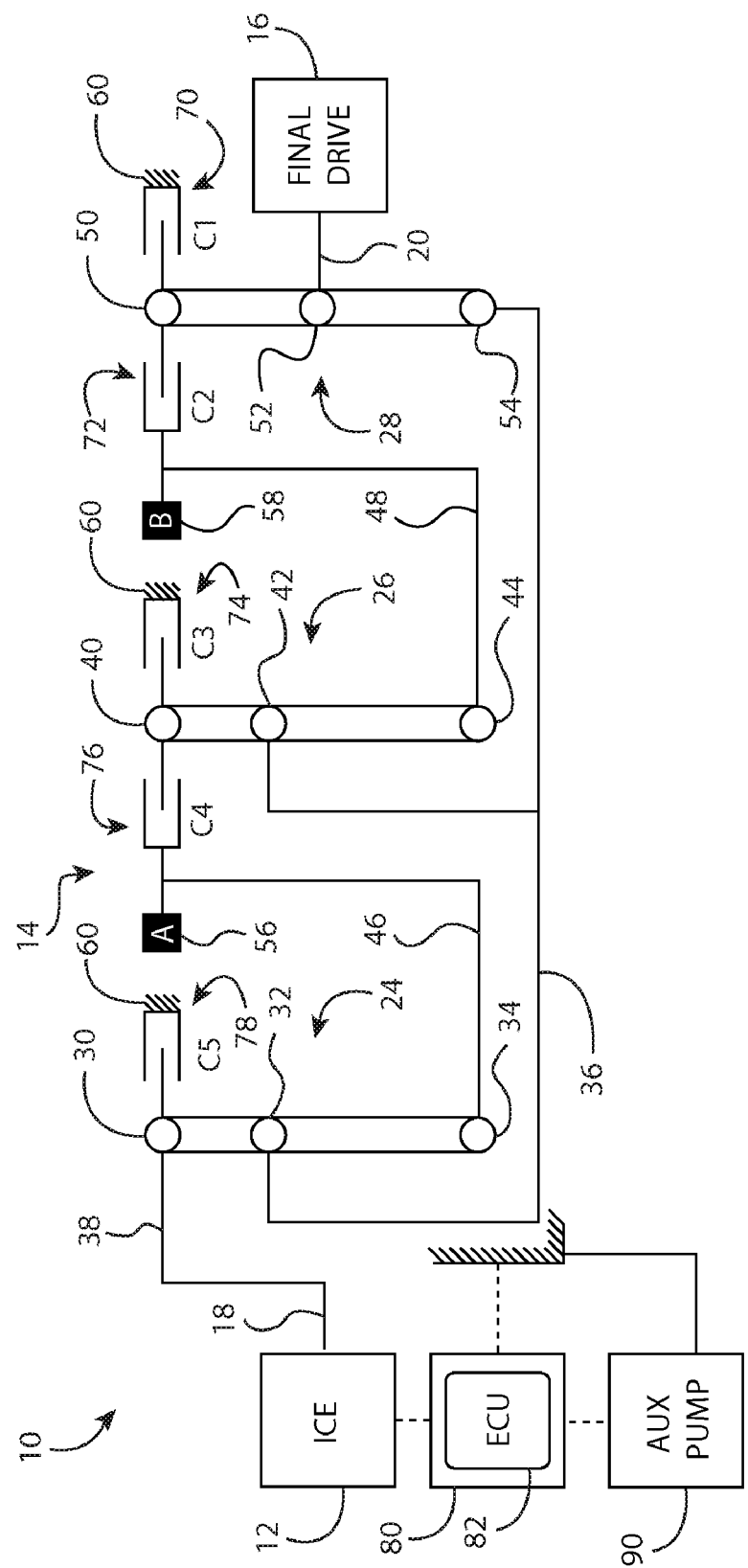
FIG. 1 is a schematic lever diagram illustration of an exemplary vehicle powertrain with a multi-mode, electrically-variable hybrid transmission in accordance with the present invention.

The claimed invention is described herein in the context of a hybrid-type vehicular powertrain having a multi-mode, multi-speed, electrically-variable, hybrid transmission, which is intended solely to offer a representative application by which the present invention may be incorporated and practiced. The claimed invention is not limited to the particular powertrain arrangement shown in the drawings. Furthermore, the hybrid powertrain illustrated herein has been greatly simplified, it being understood that further information regarding the standard operation of a hybrid powertrain, or a hybrid-type vehicle will be recognized by those having ordinary skill in the art.

Referring to the drawings, wherein like reference numbers refer to like components throughout the several views, there is shown in FIG. 1 a lever diagram depiction of an exemplary vehicle powertrain system, designated generally as 10. The powertrain 10 includes a restartable engine 12 that is selectively drivingly connected to, or in power flow communication with, a final drive system 16 via a multi-mode, electrically-variable hybrid-type power transmission 14.

A lever diagram is a schematic representation of the components of a mechanical device such as an automatic transmission. Each individual lever represents a planetary gearset, wherein the three basic mechanical components of the planetary gear are each represented by a node. Therefore, a single lever contains three nodes: one for the sun gear member, one for the planet gear carrier member, and one for the ring gear member. The relative length between the nodes of each lever may be used to represent the ring-to-sun ratio of each respective gearset. These lever ratios, in turn, are used to vary the gear ratios of the transmission in order to achieve appropriate ratios and ratio progression. Mechanical couplings or interconnections between the nodes of the various planetary gear sets and other components of the transmission (such as motor/generators) are illustrated by thin, horizontal lines. Torque transmitting devices such as clutches and brakes are presented as interleaved fingers. If the device is a brake, one set of the fingers is grounded.

The transmission 14 is designed to receive at least a portion of its driving power from the engine 12, through an input member 18, for example. The transmission input member 18, which is in the nature of a shaft, may be the engine output shaft (also referred to as a "crankshaft"). Alternatively, a transient torque damper (not shown) may be implemented between the engine 12 and the input member 18 of the transmission 14. The engine 12 transfers power to the transmission 14, which distributes torque through a transmission output member or shaft 20 to drive the final drive system 16, and thereby propel the vehicle (not shown).

In the embodiment depicted in FIG. 1, the engine 12 may be any of numerous forms of petroleum-fueled prime movers, such as the reciprocating-piston type internal combustion engines, which includes spark-ignited gasoline engines and compression-ignited diesel engines. The engine 12 is readily adaptable to provide its available power to the transmission 14 at a range of operating speeds, for example, from idle, at or near 600 revolutions per minute (RPM), to over 6,000 RPM. Irrespective of the means by which the engine 12 is connected to the transmission 14, the input member 18 is connected to a differential gear set encased within the transmission 14, as explained in more detail herein.

Referring still to FIG. 1, the hybrid transmission 14 utilizes one or more differential gear arrangements, preferably in the nature of three interconnected epicyclic planetary gear sets, designated generally at 24, 26 and 28, respectively. Each gear set includes three gear members: a first, second and third member. In referring to the first, second and third gear sets in this description and in the claims, these sets may be counted "first" to "third" in any order in the drawings (e.g., left to right, right to left, etc.). Likewise, in referring to the first, second and third members of each gear set in this description and in the claims, these members may be counted or identified as "first" to "third" in any order in the drawings (e.g., top to bottom, bottom to top, etc.) for each gear set.

The first planetary gear set 24 has three gear members: a first, second and third member 30, 32 and 34; respectively. In a preferred embodiment, the first member 30 includes of an outer gear member (which may be referred to as a "ring gear") that circumscribes the third member 34, which may include of an inner gear member (which may be referred to as a "sun gear"). In this instance, the second member 32 acts as a planet carrier member. That is, a plurality of planetary gear members (which may be referred to as "pinion gears") are rotatably mounted on the second member, planet carrier 32. Each planetary gear member is meshingly engaged with both the first member, ring gear 30 and the third member, sun gear 34.

The second planetary gear set 26 also has three gear members: a first, second and third member 40, 42 and 44, respectively. In the preferred embodiment discussed above with respect to the first planetary gear set 24, the first member 40 of the second planetary gear set 26 is an outer "ring" gear member that circumscribes the third member 44, which is an inner "sun" gear member. The ring gear member 40 is coaxially aligned and rotatable with respect to the sun gear member 44. A plurality of planetary gear members are rotatably mounted on the second member 42, which acts as a planet carrier member, such that each planetary gear meshingly engages both the ring gear member 40 and the sun gear member 44.

The third planetary gear set 28, similar to the first and second gear sets 24, 26, also has first, second and third members 50, 52 and 54, respectively. In this arrangement, however, the second member 52, shown on the middle node of the lever for the third planetary gear set 28, is the outer "ring" gear. The ring gear (second member 52) is coaxially aligned and rotatable with respect to the sun gear, third member 54. The first member 50 is the planet carrier in this particular gear set, and is shown on the top node. As such, a plurality of planetary or pinion gear members are rotatably mounted on the planet carrier, first member 50. Each of the pinion gear members is aligned to meshingly engage either the ring gear (second member 52) and an adjacent pinion gear member or the sun gear (third member 54) and an adjacent pinion gear member.

In one embodiment, the first and second planetary gear sets 24, 26 each comprise simple planetary gear sets, whereas the third planetary gear set 28 comprises a compound planetary gear set. However, each of the planet carrier members described above can be either a single-pinion (simple) carrier assembly or a double-pinion (compound) carrier assembly. Embodiments with long pinions are also possible.

The first, second and third planetary gear sets 24, 26, 28 are compounded in that the second member 32 of the first planetary gear set 24 is conjoined with (i.e., continuously connected to) the second member 42 of the second planetary gear set 26 and the third member 54 of the third planetary gear set 28, as by a central shaft 36. As such, these three gear members 32, 42, 54 are rigidly attached for common rotation.

The engine 12 is continuously connected to the first planetary gear set 24, namely first member 30, for example, through an integral hub plate 38, for common rotation therewith. The third member 34 of the first planetary gear set 24 is continuously connected, for example, by a first sleeve shaft 46, to a first motor/generator assembly 56, which is also referred to herein as "motor A". The third member 44 of the second planetary gear set 26 is continuously connected, for example, by a second sleeve shaft 48, to a second motor/generator assembly 58, also referred to herein as "motor B". The second member 52 (ring gear) of the third planetary gear set 28 is continuously connected to transmission output member 20, for example, through an integral hub plate. The first and second sleeve shafts 46, 48 may circumscribe the central shaft 36.

A first torque transfer device 70—which is herein interchangeably referred to as clutch "C1"—selectively connects the first gear member 50 with a stationary member, represented in FIG. 1 by transmission housing 60. The second sleeve shaft 48, and thus gear member 44 and motor/generator 58, is selectively connectable to the first member 50 of the third planetary gear set 28 through the selective engagement of a second torque transfer device 72—which is herein interchangeably referred to as clutch "C2". A third torque transfer device 74—which is herein interchangeably referred to as clutch "C3"—selectively connects the first gear member 40 of the second planetary gear set 26 to the transmission housing 60. The first sleeve shaft 46, and thus third gear member 34 and first motor/generator 56, is also selectively connectable to the first member 40 of the second planetary gear set 26, through the selective engagement of a fourth torque transfer device 76—which is herein interchangeably referred to as clutch "C4".

A fifth torque transfer device 78—which is herein interchangeably referred to as clutch "C5"—selectively connects the input member 18 of engine 12 and the first gear member 30 of the first planetary gear set 24 to the transmission housing 60. Clutch C5 is an input brake clutch, which selectively locks the input member 18 when engine 12 is off. Locking input member 18 provides more reaction for regenerative braking energy. As shown below, in reference to FIG. 2, C5 is not involved in the mode/gear/neutral shifting maneuvers of transmission 14.

The first and second torque transfer devices 70, 72 (C1 and C2) may be referred to as "output clutches." The third and fourth torque transfer devices 74, 76 (C3 and C4) may be referred to as "holding clutches".

In the exemplary embodiment depicted in FIG. 1, the various torque transfer devices 70, 72, 74, 76, 78 (C1-C5) are all friction clutches. However, other conventional clutch configurations may be employed, such as dog clutches, rocker clutches, and others recognizable to those having ordinary skill in the art. The clutches C1-C5 may be hydraulically actuated, receiving pressurized hydraulic fluid from one or more pumps. A main pump (not shown) may be operatively connected to the engine 12 and powered by the engine output or input member 18.

However, the main pump does not operate when engine 12 is turned off or running at speeds too low to sufficiently power the main pump and pressurize the transmission 14. An auxiliary pump 90 is included to provide hydraulic fluid to the transmission 14. Because the auxiliary pump 90 does not derive power from the engine 12, and instead derives power from one of the batteries or energy storage devices, auxiliary pump 90 is capable of supplying pressurized fluid while the vehicle is in an engine-off mode. Auxiliary pump 90 may be used, without limitation, for actuation of clutches C1-C5, lubrication of components, and cooling of the various elements of transmission 14.

In the exemplary embodiment described herein, wherein the hybrid powertrain 10 is used as a land vehicle, the transmission output shaft 20 is operatively connected to the final drive system (or "driveline"). The driveline may include a front or rear differential, or other torque transfer device, which provides torque output to one or more wheels through respective vehicular axles or half-shafts (not shown). The wheels may be either front or rear wheels of the vehicle on which they are employed, or they may be a drive gear of a track vehicle. Those having ordinary skill in the art will recognize that the final drive system may include any known configuration, including front wheel drive (FWD), rear wheel drive (RWD), four-wheel drive (4WD), or all-wheel drive (AWD), without altering the scope of the claimed invention.

All of the planetary gear sets 24, 26, 28, as well as the first and second motor/generators 56, 58 (motor A and motor B,) are preferably coaxially oriented about the intermediate central shaft 36 or another axis. Motor A or motor B may take on an annular configuration, permitting one or both to generally circumscribe the three planetary gear sets 24, 26, 28. Such a configuration may reduce the overall envelope, i.e., the diametrical and longitudinal dimensions, of the hybrid transmission 14 are minimized.

The hybrid transmission 14 receives input motive torque from a plurality of torque-generative devices. "Torque-generative devices" include the engine 12 and the motors/generators 56, 58 as a result of energy conversion from fuel stored in a fuel tank or electrical potential stored in an electrical energy storage device (neither of which is shown).

The engine 12, motor A (56,) and motor B (58) may operate individually or in concert—in conjunction with the planetary gear sets and selectively-engageable torque-transmitting mechanisms—to rotate the transmission output shaft 20. Moreover, motor A and motor B are preferably configured to selectively operate as both a motor and a generator. For example, motor A and motor B are capable of converting electrical energy to mechanical energy (e.g., during vehicle propulsion), and further capable of converting mechanical energy to electrical energy (e.g., during regenerative braking or during periods of excess power supply from engine 12).

With continuing reference to FIG. 1, an electronic control apparatus (or "controller") having a distributed controller architecture is shown schematically in an exemplary embodiment as a microprocessor-based electronic control unit (ECU) 80. The ECU 80 includes a storage medium with a suitable amount of programmable memory, collectively represented at 82, that is programmed to include, without limitation, an algorithm or method 100 of regulating operation of a multi-mode hybrid transmission, as will be discussed in further detail below with respect to FIG. 4.

The control apparatus is operable, as described hereinafter, to provide coordinated system control of the powertrain 10 schematically depicted and described herein. The constituent elements of the control apparatus may be a subset of an overall vehicle control system. The control system is operable to synthesize pertinent information and inputs, and execute control methods and algorithms to control various actuators to achieve control targets. The control system monitors target and parameters including, without limitation: fuel economy, emissions, performance, driveability, and protection of drivetrain hardware—such as, but not limited to, the engine 12, transmission 14, motor A, motor B, and final drive 16.

The distributed controller architecture (ECU 80) may include a Transmission Control Module (TCM), an Engine Control Module (ECM), a Transmission Power Inverter Module (TPIM), and a Battery Pack Control Module (BPCM). A Hybrid Control Module (HCP) may be integrated to offer overall control and coordination of the aforementioned controllers.

A User Interface (UI) is operatively connected to a plurality of devices (not shown) through which a vehicle operator typically controls or directs operation of the powertrain. Exemplary vehicle operator inputs to the user interface include an accelerator pedal, a brake pedal, transmission gear selector, vehicle speed cruise control, and other inputs recognizable to those having ordinary skill in the art.

Each of the aforementioned controllers communicates with other controllers, sensors, actuators, etc., via a control area network (CAN) bus or communication architecture. The CAN bus allows for structured communication of control parameters and commands between the various controllers. The communication protocol utilized is application-specific. For example, and without limitation, one useable communication protocol is the Society of Automotive Engineers standard J1939. The CAN bus and appropriate protocols provide for robust messaging and multi-controller interfacing between the aforementioned controllers, and other controllers providing functionality such as antilock brakes, traction control, and vehicle stability.

The engine control module is operatively connected to, and in communication with, the engine 12. The engine control module is configured to acquire data from a variety of sensors and control a variety of actuators of the engine 12 over a plurality of discrete lines. The engine control module receives an engine torque command from the hybrid control module, generates a desired axle torque, and an indication of actual engine torque, which is communicated to the hybrid control module. Various other parameters that may be sensed by the engine control module include engine coolant temperature, engine input speed to the transmission, manifold pressure, and ambient air temperature and pressure. Various actuators that may be controlled by the engine control module include, without limitation, fuel injectors, ignition modules, and throttle control modules.

The transmission control module is operatively connected to the transmission 14, and functions to acquire data from a variety of sensors and provide command signals to the transmission 14. Inputs from the transmission control module to the hybrid control module may include estimated clutch torques for each of the clutches C1-C5, and rotational speed of the transmission output shaft 20. Additional actuators and sensors may be used to provide additional information from the transmission control module to the hybrid control module for control purposes.

Each of the aforementioned controllers may be a general-purpose digital computer, generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, including resident program instructions and calibrations stored in ROM and executed to provide the respective functions of each computer. Information transfer between the various computers may be accomplished using the aforementioned CAN.

In response to operator input, as captured by the user interface, the supervisory hybrid control module controller and one or more of the other controllers described above with respect to FIG. 1 determine required transmission output torque. Selectively operated components of the hybrid transmission 14 are appropriately controlled and manipulated to respond to the operator demand. For example, in the embodiment shown in FIG. 1, when the operator has selected a forward drive range and manipulates either the accelerator pedal or the brake pedal, the hybrid control module determines an output torque for the transmission, which affects how and when the vehicle accelerates or decelerates. Final vehicle acceleration is affected by other variables, including such factors as road load, road grade, and vehicle mass. The hybrid control module monitors the parametric states of the torque-generative devices, and determines the output of the transmission required to arrive at the desired torque output. Under the direction of the hybrid control module, the transmission 14 operates over a range of output speeds from slow to fast in order to meet the operator demand.

The ECU 80 also receives frequency signals from sensors for processing into input member 18 speed, $N_i$, and output member 20 speed, $N_o$, for use in the control of transmission 14. The system controller may also receive and process pressure signals from pressure switches (not shown) for monitoring clutch application chamber pressures. Alternatively, pressure transducers for wide range pressure monitoring may be employed. Pulse-width modulation (PWM) and/or binary control signals are transmitted by the controller 80 to transmission 14 for controlling fill and drain of clutches C1-C5 for application and release thereof.

Additionally, the controller 80 may receive transmission fluid sump temperature data, such as from thermistor inputs (not shown), to derive a sump temperature. Controller 80 may provide PWM signals derived from input speed, $N_i$, and sump temperature for control of line pressure via one or more regulators.

Fill and drain of clutches C1-C5 may be effectuated, for example, by solenoid controlled spool valves responsive to PWM and binary control signals. Trim valves may be employed using variable bleed solenoids to provide precise placement of the spool within the valve body and correspondingly precise control of clutch pressure during apply. Similarly, one or more line pressure regulators (not shown) may be utilized for establishing regulated line pressure in accordance with the control signal. Clutch slip speeds across clutches may be derived from, for example: transmission input speed, output speed, motor A speed, and/or motor B speed.

Figures 2, 3:
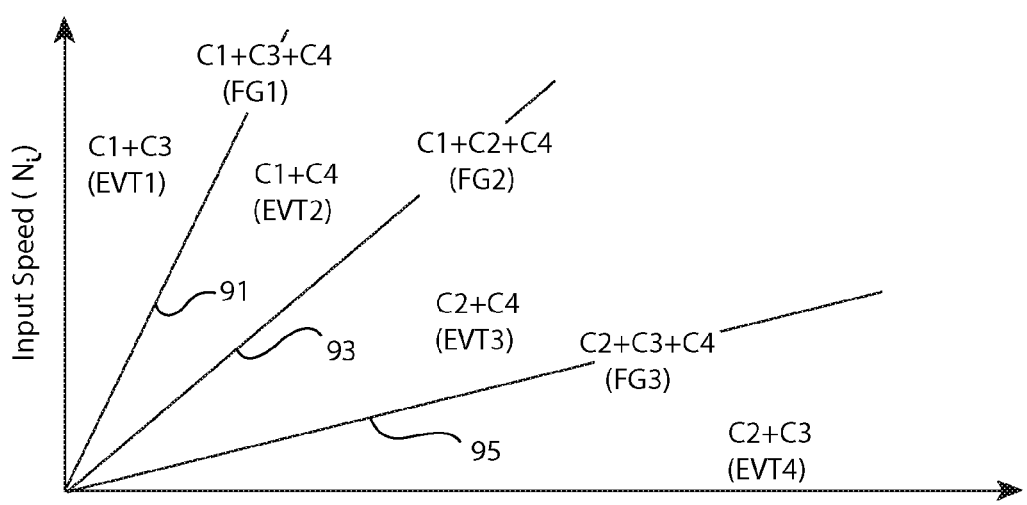
FIG. 2 is a truth table listing the engaged torque-transmitting mechanisms for each of the operating modes of the transmission illustrated in FIG. 1.
FIG. 3 is a graphical representation of various regions of operation with respect to input and output speeds of the transmission illustrated in FIG. 1.

The multi-mode, electrically-variable, hybrid transmission 14 is configured for several transmission operating modes. The truth table provided in FIG. 2 presents an exemplary engagement schedule of the torque-transmitting mechanisms C1-C4 to achieve the array of operating states or modes. The various transmission operating modes described in the table indicate which of the specific clutches C1-C4 are engaged (actuated), and which are released (deactivated) for each of the operating modes.

In general, ratio changes in transmission 14 may be performed such that torque disturbances are minimized, and the shifts are smooth and unobjectionable to the vehicle occupants. Additionally, release and application of clutches C1-C4 should be performed in a manner which consumes the least amount of energy, and does not negatively impact durability of the clutches. One major factor affecting these considerations is the torque at the clutch being controlled, which may vary significantly in accordance with such performance demands as acceleration and vehicle loading. Improved shifts may be accomplished by a zero, or close to zero, reactive torque condition at the clutches at the time of application or release, which condition follows substantially zero slip across the clutch. Clutches having zero slip across the clutch may be referred to as operating synchronously.

Electrically-variable operating modes may be separated into four general classes: input-split modes, output-split modes, compound-split modes, and series modes. In an input-split mode, one motor/generator (such as either motor A or motor B) is geared such that its speed varies in direct proportion to the transmission output, and another motor/generator (such as the other of motor A or motor B) is geared such that its speed is a linear combination of the input and output member speeds. In an output-split mode, one motor/generator is geared such that its speed varies in direct proportion to the transmission input member, and the other motor/generator is geared such that its speed is a linear combination of the input member and the output member speeds. A compound-split mode, however, has both motor/generators geared such that their speeds are linear combinations of the input and output member speeds, but neither is in direct proportion to either the speed of the input member or the speed of the output member.

Finally, when operating in a series mode, one motor/generator is geared such that its speed varies in direct proportion to the speed of the transmission input member, and another motor/generator is geared such that its speed varies in direct proportion to the speed of the transmission output member. When operating in series mode, there is no direct mechanical power transmission path between the input and output members and therefore all power must be transmitted electrically.

In each of the four general types of electrically-variable operating modes indicated above, the speeds of the motors are linear combinations of the input and output speeds. Thus, these modes have two speed degrees of freedom (which may be abbreviated for simplicity as "DOF"). Mathematically, the torque (T) and speed (N) equations of this class of modes take the form:

$$\begin{bmatrix} T_a \\ T_b \end{bmatrix} = \begin{bmatrix} a_{1,1} & a_{1,2} \\ a_{2,1} & a_{2,2} \end{bmatrix} \begin{bmatrix} T_i \\ T_o \end{bmatrix} \text{ and } \begin{bmatrix} N_a \\ N_b \end{bmatrix} = \begin{bmatrix} b_{1,1} & b_{1,2} \\ b_{2,1} & b_{2,2} \end{bmatrix} \begin{bmatrix} N_i \\ N_o \end{bmatrix}$$

where a and b are coefficients determined by the transmission gearing. The type of EVT mode can be determined from the structure of the matrix of b coefficients. That is, if $b_{2,1}=b_{1,2}=0$ or $b_{1,1}=b_{2,2}=0$, the mode is a series mode. If $b_{1,1}=0$ or $b_{1,2}=0$, the mode is an input split mode. If $b_{2,1}=0$ or $b_{2,2}=0$, the mode is an output split mode. If each of $b_{1,1}$, $b_{1,2}$, $b_{2,1}$, and $b_{2,2}$ are nonzero, for example, the mode is a compound split mode.

An electrically-variable transmission may also contain one or more fixed-gear (FG) modes. In general, FG modes result from closing (i.e., actuating) one additional clutch than the number required to select an electrically-variable mode. In FG modes, the speed of the input and each motor are proportional to the speed of the output. Thus, these modes have only one speed degree of freedom. Mathematically, the torque and speed equations of this class of modes take the form:

$$[T_b] = \begin{bmatrix} a_{1,1} & a_{1,2} & a_{1,3} \end{bmatrix} \begin{bmatrix} T_a \\ T_i \\ T_o \end{bmatrix} \text{ and } \begin{bmatrix} N_a \\ N_b \\ N_i \end{bmatrix} = \begin{bmatrix} b_{1,1} & b_{1,2} & b_{1,3} \end{bmatrix} [N_o]$$

where a and b are again coefficients determined by the transmission gearing. If $b_{1,1}$ is nonzero, motor A can contribute to output torque during operation in the fixed-gear mode. If $b_{1,2}$ is nonzero, motor B can contribute to output torque during operation in the fixed-gear mode. If $b_{1,3}$ is nonzero, the engine can contribute to output torque during operation in the fixed-gear mode. If $b_{1,3}$ is zero, the mode is an electric-only fixed-gear mode.

An electrically-variable transmission may also be configured for one or more modes with three speed degrees of freedom. These modes may or may not include reaction torque sources such that the transmission is capable of producing output torque proportional to engine torque or motor torque. If a mode with three speed degrees of freedom is capable of producing output torque, the torques of the engine and any motor connected as a reaction to the engine torque will generally be proportional to the output torque. If a motor is not connected as a reaction to the engine torque, its torque can be commanded to control its speed independently of the transmission input and output speed.

In a mode with three speed degrees of freedom, it is generally not possible to easily control battery power independently of output torque. This type of mode produces an output torque which is proportional to each of the reacting torque sources in the system. The fraction of total output power provided by each of the three torque sources may be adjusted by varying the speeds of the motors and input. These modes are hereafter referred to as electric torque converter (ETC) modes in recognition of the fact that power flows to or from the energy storage device as a function of the output torque and the speed of the engine, output, and one of the motors. Mathematically, the torque and speed equations of this class of modes take the form:

$$\begin{bmatrix} T_a \\ T_b \\ T_i \end{bmatrix} = \begin{bmatrix} a_{1,1} & a_{1,2} & a_{1,3} \end{bmatrix} [T_o] \text{ and } [N_b] = \begin{bmatrix} b_{1,1} & b_{1,2} & b_{1,3} \end{bmatrix} \begin{bmatrix} N_a \\ N_i \\ N_o \end{bmatrix}$$

where a and b are coefficients determined by the transmission gearing. If $a_{1,1}$ is nonzero, motor A serves as a reaction member and its torque is proportional to output torque when operating in the ETC mode. If $a_{1,1}$ is zero, motor A is disconnected and its torque is not determined by the output torque. If $a_{1,2}$ is nonzero, motor B serves as a reaction member and its torque is proportional to output torque when operating in the ETC mode. If $a_{1,2}$ is zero, motor B is disconnected and its torque is not determined by the output torque. If $a_{1,3}$ is nonzero, the engine can contribute to output torque during operation in the fixed-gear mode. If $a_{1,3}$ is zero, the input is disconnected and its torque is not determined by the output torque. If all of $a_{1,1}$, $a_{1,2}$, and $a_{1,3}$ are zero, the mode is a neutral mode that is not capable of producing output torque.

There are four neutral modes presented in FIG. 2. In Neutral 1, all clutches are released. Neutral 1 may be utilized when the entire vehicle is stopped and in an off-state, and thus there is no power distribution, electrical, mechanical, or otherwise, being actively distributed throughout the powertrain 10. In Neutral 1, a 12-volt starting-lighting-and-ignition (SLI) battery may be used for engine start.

In Neutral 2, only clutch C3 is engaged, and motor A and motor B may react engine 12 for start or to charge the energy storage device. Similar to Neutral 2, when transmission 14 is in Neutral 3, motor A and motor B may react engine 12 for start or to charge the energy storage device, and clutch C4 as the only engaged torque-transmitting device. In Neutral 4, the third and fourth clutches C3, C4 are both in an activated state. In this instance, motor A is locked or "grounded", and motor B is geared with the engine 12 for engine start.

The first and second planetary gear sets 24, 26 cooperate with the first and second motor/generators 56, 58, along with the selective engagement of the first and second clutches C1, C2, to constitute an electric torque converter (ETC). For example, when the transmission 14 is operating in an ETC mode, the electric output of motor A and/or motor B, depending upon the active control schedule, can be adapted to control the transfer of torque from the engine 12 through the transmission differential gearing to the output member 20. When the vehicle is started, ETC1 Mode is established by engaging the first clutch C1. In ETC1 Mode, motor A reacts engine 12 with the first and third planetary gear sets 24, 28, and motor B freewheels. In ETC1 Mode, the stationary vehicle can be smoothly started with the engine 12 held at a suitable speed by gradually increasing the amount of electric power generated by motor A—i.e., the reaction force of motor A.

There are two other alternative ETC modes available utilizing the transmission configuration presented herein. ETC2 Mode, also known as "compound ETC", can be initiated by engaging clutch C2, and disengaging the remaining clutches. In ETC2 Mode, motor A reacts engine 12 with the first and third planetary gear sets 24, 28, while motor B reacts engine 12 and motor A to the output member 20. The distribution of engine torque is manipulated through the cooperative management of the amount of electric power output generated by motor A and motor B.

The third ETC mode, ETC12 Mode, can be initiated by engaging both clutch C1 and clutch C2. Similar to ETC1 Mode, motor A reacts the engine 12 with the first and third planetary gear sets 24, 28. However, in this instance, motor B is grounded to the transmission housing 60. In ETC12 Mode, the vehicle can be smoothly accelerated with the engine 12 held at a suitable speed by gradually increasing the reaction force generated by motor A; which may be proportional to the electric power generated by motor A.

When the engine 12 is in an off-state, the transmission 14 can utilize the ETC mode clutch control schedule to vary the amount of electric energy generated by motor A so as to gradually increase the drive torque of motor A and/or motor B. For example, if the transmission 14 is shifted into ETC1 Mode when the engine 12 is in an off-state, the engine 12 will create a reaction force, by way of input member 18. The motive output of the motor A can then be controlled, and a continuous and uninterrupted transmission output torque maintained, without having to turn the engine 12 on.

The exemplary powertrain 10 described herein has three fixed-gear (FG), or "direct," modes of operation. In all fixed-gear modes of this embodiment of transmission 14, the vehicle is driven in the forward direction by operation of the engine 12. The selective engagement of clutches C1, C3 and C4 shifts the transmission 14 into FG1 Mode. In FG1, motor A is grounded, and the engine drives the first planetary gear set 24 to the third planetary gear set 28 and, thus, the output member 20. FG2 Mode is achieved by the selective engagement of clutches C1, C2 and C4. In FG2, motor B is grounded, and the engine drives the first and second planetary gear sets 24, 26 to the third planetary gear set 28 and, thus, the output member 20. Likewise, FG3 Mode is achieved by the selective engagement of clutches C2, C3 and C4. In FG3, motor A is locked, and the engine drives the first planetary gear set 24 to the second and third planetary gear sets 26, 28 and the output member 20. When operating in a fixed-gear mode of operation, the output member speed $N_o$ is directly proportional to input member speed $N_i$ and the selected gear ratio. $N_i = N_o \times GR$.

With continued reference to FIG. 2, the transmission 14 may also operate in four electrically-variable transmission (EVT) modes. In EVT1 and EVT4, the transmission 14 is operating in an input-split mode of operation, wherein the output speed $N_o$ of the transmission 14 is proportional to the speed of one motor/generator 56, 58 (motor A or motor B). Specifically, EVT1 Mode is achieved through the selective engagement of the first and third clutches C1 and C3. When in EVT1, motor A functions to react the engine 12 with the first planetary gear set 24, to the third planetary gear set 28, and the output member 20; while motor B drives the second and third planetary gear sets 26, 28. Motor A propels the vehicle in EVT1. Alternatively, the transmission 14 may be selectively shifted into EVT4 Mode by actuating clutch C2 and clutch C3. In EVT4, motor A functions to react the engine 12 with the first planetary gear set 24, to the second and third planetary gear sets 26, 28, and the output member 20, while motor B drives the second and third planetary gear sets 26, 28. Motor B propels the vehicle in EVT4.

In EVT2 and EVT3, the transmission 14 is operating in a compound-split mode, wherein the output speed No of the transmission 14 is not proportional to the speed of a single motor/generator, but is rather an algebraic linear combination of the speeds of both motor/generators. More particularly, EVT2 is achieved through the selective engagement of the first and fourth clutches C1, C4. In this mode, motor A and motor B operate to react the engine 12 with the first and second planetary gears sets. Alternatively, the transmission 14 may be selectively shifted into EVT3 Mode by actuating clutch C2 and clutch C4. When operating in EVT3 Mode, the two motor/generator assemblies 56, 58 react the engine 12 with all three planetary gear sets 24, 26, 28.

With reference to FIG. 3, a plot of transmission output speed, $N_o$, along the horizontal axis versus input speed, $N_i$, across the vertical axis is illustrated. FIG. 3 is only a graphical representation of exemplary regions of operation for each operating mode with respect to input and output speeds of this embodiment of transmission 14.

Synchronous operation in FG1—the input speed and output speed relationships where clutches C1, C3 and C4 are operating with substantially zero slip speed thereacross—is represented by line 91. As such, line 91 represents an input and output speed relationship at which substantially synchronous shifting between EVT modes can occur. FG1 is also a range at which direct mechanical coupling from input to output can be effected by simultaneous application of clutches C1, C3 and C4—i.e., fixed- or direct-ratio.

Synchronous operation in FG2—the input speed and output speed relationships where clutches C1, C2 and C4 are operating with substantially zero slip speed thereacross—is represented by line 93. Similarly, the relationships between input and output speed during operation in FG3, whereat clutches C2, C3 and C4 are operating simultaneously with substantially zero slip speed thereacross, is represented by line 95.

To the left of the shift ratio line 91 is an exemplary region of operation for the first EVT mode, EVT1, wherein both C1 and C3 are applied, and C2 and C4 are released. To the right of the shift ratio line 91 and left of shift ratio line 93 is an exemplary region of operation for the second EVT mode, EVT2, wherein C1 and C4 are applied, and C2 and C3 are released.

To the right of shift line 93 and left of shift ratio line 95 is an exemplary region of operation for the third EVT mode, EVT3, wherein both C2 and C4 are applied, and C1 and C3 are released. To the right of the shift ratio line 95 is an exemplary region of operation for the fourth EVT mode, EVT4, wherein C2 and C3 are applied, and C1 and C4 are released. As used herein with respect to clutches C1-C5, the terms "applied" or "actuated" indicate substantial torque transfer capacity across the respective clutch. Antithetically, the terms "released" or "deactivated" indicate insubstantial or no torque transfer capacity across the respective clutch.

While the regions of operation specified above may be generally favored for operation of the hybrid transmission 14, it is not meant to imply that the various EVT regions of operation depicted in FIG. 3 cannot or do not overlap. Generally, however, it may be preferred to operate in the specified regions because each particular mode of operation preferably employs gear sets and motor hardware particularly well suited in various aspects (e.g., mass, size, cost, inertial capabilities, etc.) for that region. Similarly, while the individual regions of operation specified above are generally preferred for the particular modes of operation indicated, it is not meant to imply that the regions of operation for the individual EVT modes cannot be switched.

Generally, a shift into Mode 1 may be considered a downshift and is associated with a higher gear ratio in accordance with the relationship of $N_i/N_o$. In contrast, a shift into Mode 4 is considered an upshift, and is associated with a lower gear ratio in accordance with the relationship of $N_i/N_o$. As discussed herein, other mode-to-mode shift sequences are feasible. For example, a shift from EVT1 to EVT3 is also an upshift, while a shift from EVT4 to EVT2 is considered a downshift.

Figure 4:
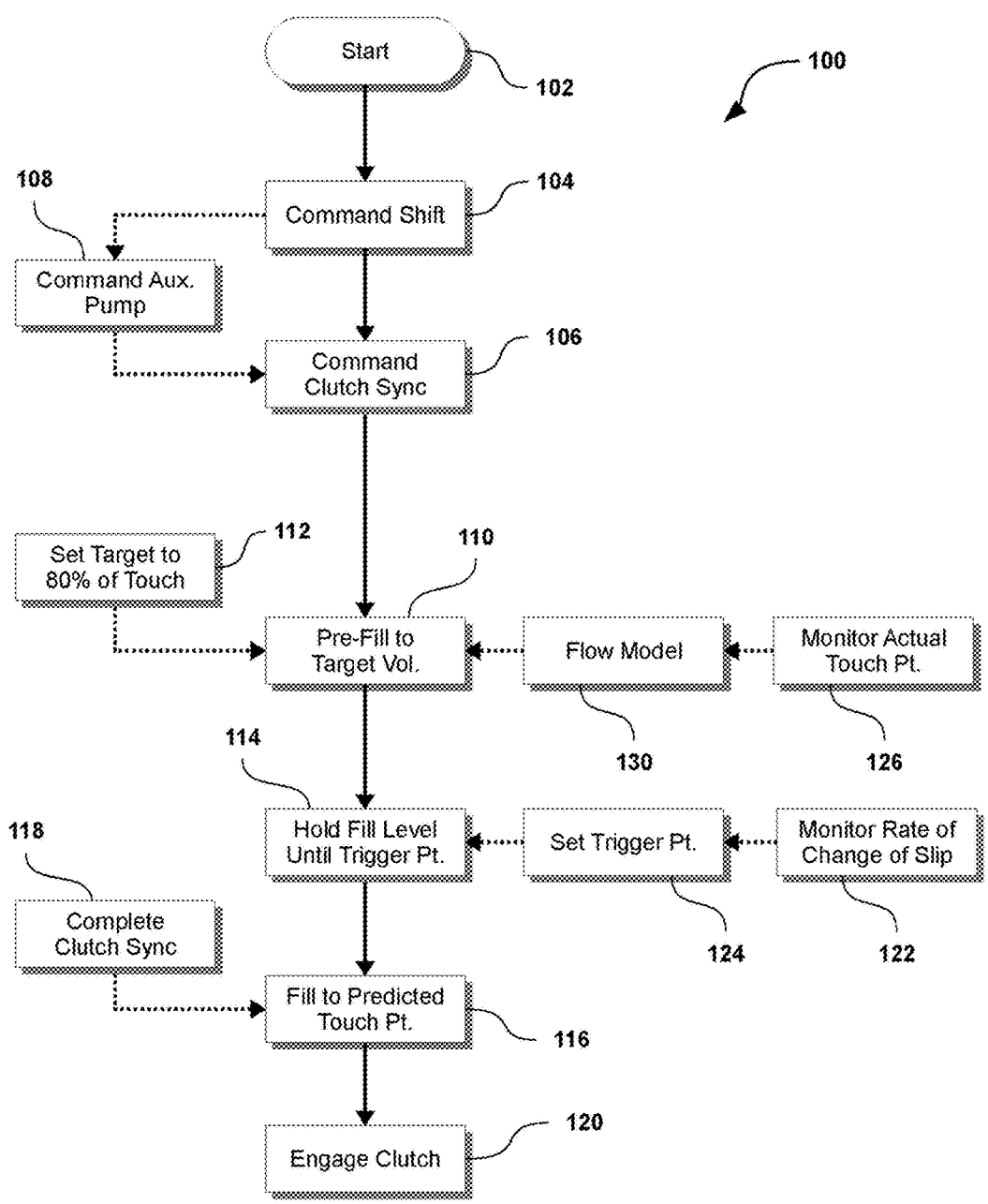
FIG. 4 is a flow chart or block diagram illustrating a shift control method in accordance with the present invention.
Figure 5:
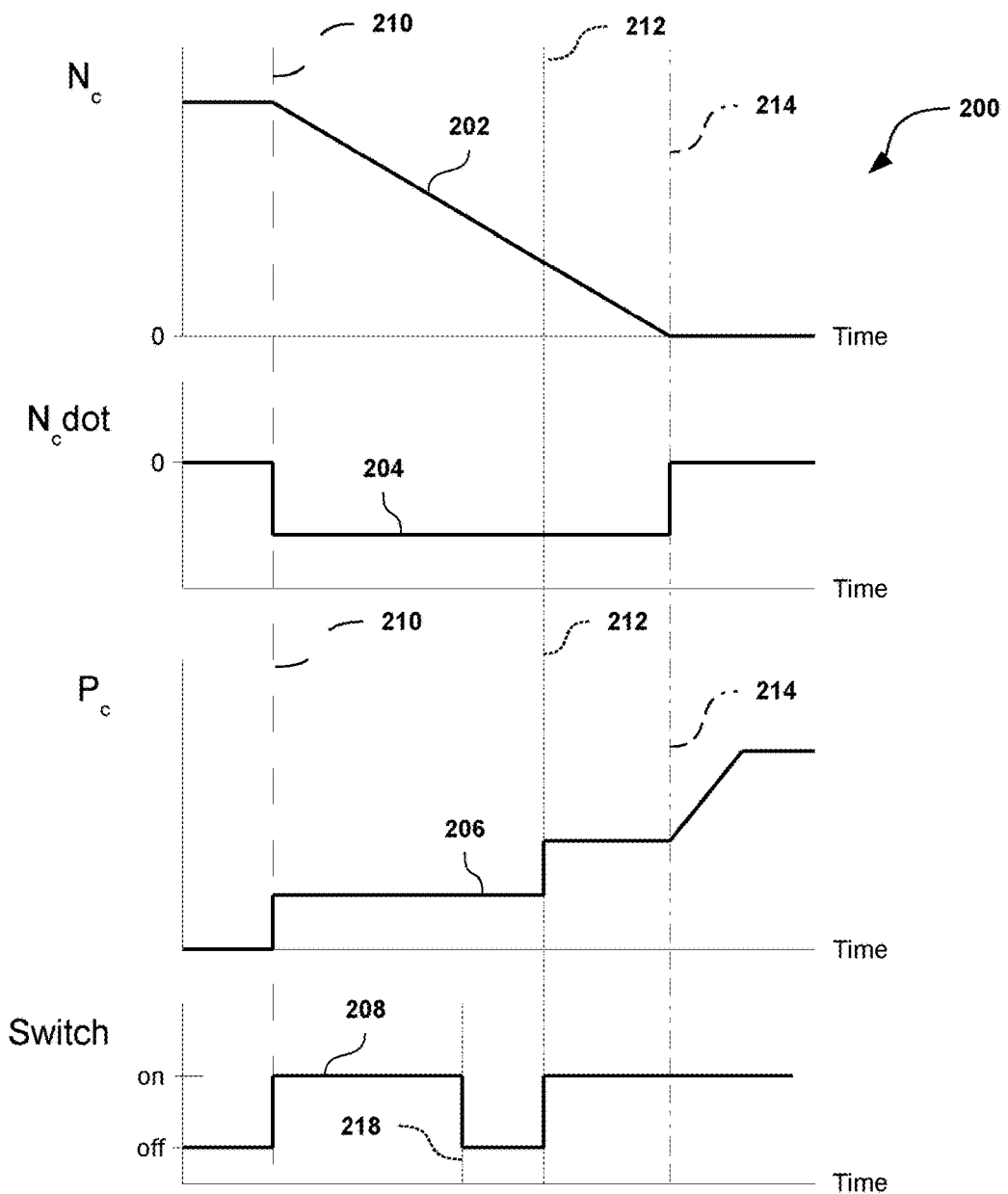
FIG. 5 is a schematic graphical representation of selected characteristics of the clutch, plotted with respect to time, during a shift event.

With reference now to the flow chart shown in FIG. 4 and the schematic graphs shown in FIG. 5, and with continued reference to FIGS. 1-3, there is described control and actuation of a clutch of a multi-mode hybrid transmission during shift events. FIG. 4 shows a control algorithm or method for regulating operation of a clutch or clutches of multi-mode hybrid transmission generally at 100.

FIG. 5 shows graphs of selected characteristics of the clutch, plotted with respect to time, during a shift event 200 which may coincide with portions of the method 100 shown in FIG. 4. From top to bottom, FIG. 5 shows clutch slip speed, $N_c$; the time rate of change (first derivative) of clutch slip speed, $N_c$dot; pressure of the clutch, $P_c$; and state of the pressure switch or variable bleed solenoid monitoring and controlled flow of hydraulic fluid to the clutch.

For illustrative purposes, the method 100 and shift event 200 are described with reference to many of the structures shown and described in relation to FIG. 1. However, those having ordinary skill in the art will recognize other structures which may be used to practice the invention as defined in the appended claims.

Method 100 begins at an initiation or start 102, which may coincide with a vehicle operator turning on the ignition of the vehicle, or may coincide with another initiation event. During the entirety of method 100, the hybrid control module and ECU 80 may be monitoring various attributes of the vehicle and hybrid powertrain 10. For illustrative purposes only, the method 100 will be described with specific reference to clutch C3. However, the method 100 may be implemented for control and actuation of any of the clutches C1-C5.

As the hybrid control module monitors vehicle operation characteristics, it may request or command that the transmission 14 perform a shift event (such as the shift event 200 of FIG. 5), at step 104. At step 106, method 100 then proceeds to command the clutch C3 to begin synchronization by controlling the magnitude of the slip speed to zero. Controlling slip speed toward zero may include decreasing or increasing the actual speed off the elements connectable by the clutch C3. Optionally, method 100 may include commanding the auxiliary pump 90 to turn on at step 108, which may occur contemporaneously or after the shift is commanded at step 104.

In a traditional control scheme for the clutch C3, the hybrid control system waits a predetermined amount of time after the shift is commanded and then begins to fill the clutch at a high flow rate. This may cause the clutch to engage either too early or too late, depending upon the fill time required to take the clutch from empty (completely disengaged) to full (completely engaged). Also the pump pressure available to fill the clutch may affect the fill time and cause late engagement if insufficient pressure is available for the traditional hydraulic clutch control.

Commanding synchronization of the clutch C3 at step 106 occurs at or near line 210 in FIG. 5. At this point, the previous, or baseline, characteristics of clutch C3 end as the transmission 14 begins preparing clutch C3 for engagement. Slip speed, $N_c$, is shown on curve 202, and begins to move toward zero slip ($N_c$=0). Because clutch C3 is a brake-type clutch in the embodiment shown in FIG. 1, synchronization involves stopping rotation of the first member 40 of the second planetary gear set 26 (the ring gear of P2). Synchronization of clutch C3 causes $N_c$dot, shown as curve 204 in FIG. 5, to move from zero to a non-zero value as $N_c$ slows down.

Method 100 then begins filling the clutch C3 to a pre-fill target volume at step 110. This causes fluid to move into the piston of clutch C3 and increases the pressure of clutch C3, $P_c$, which is shown on curve 206 of FIG. 5. Pressure switch state of clutch C3 is shown on curve 208 of FIG. 5. Beginning to fill clutch C3 causes the pressure switch to move from an "off" or regulated-flow state to an "on" or full-feed state. Note that the pressure switch signal is often communicated as either a "0" or "1" digital logic signal. Either of the pressure switch on/off states shown in FIG. 5 may coincide with either the 0 or 1 digital logic states of the switch signal. Those having ordinary skill in the art will recognize that the curves shown during shift event 200 in FIG. 5 are very schematic, and that the actual characteristics of clutch C3 are unlikely to vary in completely linear fashions.

Pre-filling the clutch C3 to the pre-fill target volume readies clutch C3 to be fully-actuated and engaged with reduced lag time or delay, when compared to filling an empty clutch in order to effect engagement. Complete torque transfer across clutch C3 does not occur until the clutch C3 has been filled to an actual touch point volume.

The pre-fill target volume may be set to approximately 80 percent of a first predicted touch point volume, as shown in optional step 112. However, instead of controlling clutch C3 based upon volume, note that the clutch may also be controlled based upon clutch pressure, $P_c$, which is related to clutch volume. Furthermore, the pre-fill target volume may be set to a more-specific level of between 80 to 90 percent of the predicted touch point volume.

The first predicted touch point volume (and pressure) may have been determined through experiment or in the design stages of the powertrain 10. As described below, the method 100 may adjust the predicted touch point volume to adjust for changing conditions of the clutch C3 and transmission 14.

At step 114, clutch C3 is held at the pre-fill target volume until the hybrid control system determines that the shift event 200 for clutch C3 is ready to be completed. Method 100 holds the volume of C3 at step 114 until a trigger point is reached. The trigger point is shown as line 212 in FIG. 5 and is calculated or determined by the amount of time needed to finish filling clutch C3 to the touch point volume.

Holding clutch C3 at the pre-fill target volume (until the trigger point 212 is reached) is shown beginning at line 218 of FIG. 5, and occurs by turning the pressure switch off and regulating or maintaining $P_c$ at substantially constant pressure. Touch point volume coincides with clutch C3 reaching a touch point, which is shown at 214 in FIG. 5, and the point at which clutch C3 begins transferring full torque between the ring gear 40 and the transmission housing 60. The difference between the trigger point 212 and the touch point 214 is the effective fill time of the clutch C3 when using the pre-fill actuation method.

After reaching the trigger point 212, method 100 begins completing the shift event 200 by filling the clutch C3 to the first predicted touch point volume at step 116. Method 100 utilizes the first predicted touch point volume because the actual touch point volume may not be known due to variations in temperature of the hydraulic fluid, leaks in clutch C3 or elsewhere in transmission 14, or variations in pumping pressure. The first predicted touch point volume is greater than the pre-fill target volume.

After reaching the touch point 214, the pressure of clutch C3 is sufficient for torque transfer across C3, and the clutch engages at step 120. After the touch point 214, clutch pressure, $P_c$, will increase as torque transfer through clutch C2 occurs. As shown on line 208, the pressure switch maintains the on, or full-feed, state to maintain the maximum available fluid pressure to the clutch C3 and continue engagement.

In some shift events, the actual touch point volume may be greater or less than the first predicted touch point volume. If the first predicted touch point does not cause actual, full engagement of clutch C3, the pressure switch remains open and will therefore continue filling the clutch piston until the actual touch point.

If the clutch C3 has not already been fully-synchronized, the method 100 may complete synchronization—by bringing slip speed to substantially zero—prior to fully engaging the clutch in step 120. Completing synchronization is shown in FIG. 4 as optional step 118 and may occur prior to, along with, or after filling clutch C3 to the predicted touch point in step 116.

In one embodiment of the method 100, the trigger point 212 may be calculated or set to occur substantially simultaneously with the completion of synchronization of the clutch C3. In such an embodiment the trigger point 212, and start of filling the clutch to the predicted touch point in step 116, occurs when the slip speed, $N_c$, reaches zero.

As shown in FIG. 5, pre-filling the clutch C3 to the pre-fill target volume (step 110) may begin simultaneously with commanding the shift, shown at line 210. In such an embodiment, the hybrid control system begins preparing clutch C3 for the shift as soon as the shift is commanded. However, if fill times were decreased, the hybrid control system may delay pre-filling clutch C3 until after the shift is commanded and synchronization has already begun.

The trigger point 212 may be adjusted or calculated during the shift event 200. As shown in FIG. 4, the method 100 may determine the time rate of change of the slip speed in optional step 122. This first derivative of slip speed, $N_c$dot, is then used at step 124 to set the trigger point 212. Step 124 sets the trigger point 212 by calculating when slip speed, $N_c$, will reach zero and subtracting the effective fill time from the predicted reaching of zero slip speed. In such an embodiment, the predicted touch volume is reached substantially coincidentally with complete synchronization of clutch C3, which is the earliest point where a synchronous shift can occur.

To further refine or adjust the control algorithm for timing shifts, the method 100 may optionally monitor the actual pressure ($P_c$) of the clutch C3. By monitoring the pressure ($P_c$) and switch state of clutch C3 during actual shift events, the method 100 is able to calculate or estimate the actual touch point volume of the shift events. This is shown in FIG. 4 as step 126. These monitored shifts may be either shifts using the pre-fill actuation scheme or may use standard clutch actuation techniques.

From the monitored shift events, the method 100 calculates a flow model, shown at optional step 130, which is updated every time a shift event occurs to better determine the actual touch point volume of the clutch C3. The flow model may then be used to determine the amount of fluid accumulated in the clutch piston and therefore determine when a sufficient amount of fluid has entered the clutch piston to move clutch C3 to the pre-fill volume.

It is within the scope of the claimed invention to omit steps from method 100, include additional steps in method 100, and/or modify the order presented in FIG. 4. It should be further noted that the method 100 generally represents only a single shift sequence or event. However, it is expected, as indicated above, that the method 100 be applied in a systematic and repetitive manner. The use of such terminology as "sensing", "detecting", "measuring", "calculating", or otherwise "determining" is not intended as limiting, and should be considered interchangeable.

While the best modes and other modes for carrying out the present invention have been described in detail, those familiar with the art to which this invention pertains will recognize various alternative designs and embodiments for practicing the invention within the scope of the appended claims.

The invention claimed is:

1. A method of actuating a clutch of a multi-mode hybrid transmission, comprising:
   commanding a shift event in the multi-mode hybrid transmission;
   monitoring a slip speed of the clutch;
   beginning synchronization of the clutch by moving said slip speed to zero;
   filling the clutch to a pre-fill target volume;
   holding the clutch at said pre-fill target volume; and
   filling the clutch to a first predicted touch point volume after said slip speed reaches a trigger point, wherein said first predicted touch point volume is greater than said pre-fill target volume.

2. The method of claim 1, wherein said pre-fill target volume is greater than approximately 80 percent of said first predicted touch point volume.

3. The method of claim 2, further comprising:
   determining a time rate of change of said slip speed; and
   setting said trigger point based upon said determined time rate of change of said slip speed.

4. The method of claim 3, further comprising:
   monitoring an actual pressure of the clutch;
   calculating an actual touch point volume from said monitored actual pressure;
   calculating a flow model based upon said calculated actual touch point volume; and
   determining when the clutch has been filled to said pre-fill target volume based upon said flow model.

5. The method of claim 4, wherein said filling the clutch to said pre-fill target volume begins approximately simultaneously with said commanding said shift event.

6. The method of claim 5, wherein said filling the clutch includes generating pressure by using an auxiliary pump, wherein said auxiliary pump is characterized by receiving power from sources other than an internal combustion engine.

7. The method of claim 2, further comprising setting said trigger point to occur substantially simultaneously with completion of said synchronization of the clutch, such that trigger point occurs when said slip speed reaches zero.

8. A method of actuating a clutch incorporated into a multi-mode hybrid transmission, comprising:
   executing a first shift event, including:
      commanding said first shift event,
      monitoring a first slip speed of the clutch,
      synchronizing the clutch by controlling the magnitude of said first slip speed toward zero,
      filling the clutch to a pre-fill target volume, holding the clutch at said pre-fill target volume, and
when said first slip speed reaches a first trigger point, filling the clutch to a first predicted touch point volume, wherein said first predicted touch point volume is greater than said pre-fill target volume;

executing a second shift event, including:
commanding said second shift event,
monitoring an actual pressure of the clutch,
monitoring a second slip speed of the clutch,
synchronizing the clutch by controlling the magnitude of said second slip speed toward zero, and
calculating an actual touch point volume of said second shift event from said monitored actual pressure during said second shift event;

setting a second predicted touch point volume, approximately equal to said calculated actual touch point volume; and executing a third shift event, including:
commanding said third shift event,
monitoring a third slip speed of the clutch,
synchronizing the clutch by controlling the magnitude of said third slip speed toward zero,
filling the clutch to said pre-fill target volume,
holding the clutch at said pre-fill target volume, and
filling the clutch to said calculated actual touch point volume when said third slip speed reaches a second trigger point.

9. The method of claim 8, further comprising:
calculating a flow model based upon said calculated actual touch point volume; and
determining when the clutch has been filled to said pre-fill target volume based upon said flow model.

10. The method of claim 9, further comprising:
determining a time rate of change of said first slip speed;
setting said first trigger point based upon said determined time rate of change of said first slip speed;
determining a time rate of change of said second slip speed; and
setting said second trigger point based upon said determined time rate of change of said second slip speed.

11. The method of claim 10, wherein said pre-fill target volume is greater than approximately 80 percent of said first predicted touch point volume.

12. The method of claim 11, wherein said filling the clutch to said pre-fill target volume while executing said first shift event begins approximately simultaneously with said commanding said first shift event, and said filling the clutch to said pre-fill target volume while executing said third shift event begins approximately simultaneously with said commanding said third shift event.

13. The method of claim 12, wherein said filling the clutch includes generating pressure by using an auxiliary pump, wherein said auxiliary pump is characterized by receiving power from sources other than an internal combustion engine.

14. The method of claim 13, wherein said pre-fill target volume is between approximately 80 to 90 percent of said first predicted touch point volume.

* * * * *